United States Patent
Loehr et al.

(10) Patent No.: US 11,936,555 B2
(45) Date of Patent: *Mar. 19, 2024

(54) DUPLICATING PDCP PDUS FOR A RADIO BEARER

(71) Applicant: Motorola Mobility LLC, Chicago, IL (US)

(72) Inventors: Joachim Loehr, Wiesbaden (DE); Prateek Basu Mallick, Dreieich (DE); Ravi Kuchibhotla, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,498

(22) Filed: May 23, 2022

(65) Prior Publication Data
US 2022/0286382 A1 Sep. 8, 2022

Related U.S. Application Data

(63) Continuation of application No. 16/799,420, filed on Feb. 24, 2020, now Pat. No. 11,343,169, which is a (Continued)

(51) Int. Cl.
*H04L 1/08* (2006.01)
*H04L 45/00* (2022.01)
(Continued)

(52) U.S. Cl.
CPC .............. *H04L 45/14* (2013.01); *H04L 1/08* (2013.01); *H04L 45/24* (2013.01); *H04L 69/324* (2013.01);
(Continued)

(58) Field of Classification Search
CPC ......... H04L 1/08; H04L 1/1835; H04L 5/001; H04L 12/707; H04L 12/721; H04L 29/06;
(Continued)

(56) References Cited

U.S. PATENT DOCUMENTS 8,605,674 B2 12/2013 Park et al.
9,883,419 B2 1/2018 Basu Mallick et al.
(Continued)

FOREIGN PATENT DOCUMENTS

WO 2015064931 A1 5/2015

OTHER PUBLICATIONS

Ericsson, "Controlling of duplication in case of CA", 3GPP TSG-RAN WG2 #97bis, Tdoc R2-1702753, Apr. 3-7, 2017, pp. 1-4.
(Continued)

*Primary Examiner* — Frank Duong
(74) *Attorney, Agent, or Firm* — Kunzler Bean & Adamson

(57) ABSTRACT

For duplicating PDCP PDUs for a radio bearer, methods, apparatus, and systems are disclosed. One apparatus includes a processor and a transceiver for communicating with a mobile communication network. The processor establishes a radio bearer to communicate with the network, the radio bearer includes a PDCP entity, first and second RLC entities associated with said PDCP entity, first and second logical channels associated with said first and second RLC entities, respectively. The processor receives a control signal from the network, submits a PDCP data PDU in the PDCP entity to the first RLC entity for transmission. In response to the first control signal, the processor submits the PDCP data PDU to the second RLC entity for transmission. The processor indicates to one of the first and second RLC entities to discard a duplicate PDCP data PDU corresponding to a successfully delivered PDCP data PDU.

20 Claims, 7 Drawing Sheets

Related U.S. Application Data continuation of application No. 15/961,510, filed on Apr. 24, 2018, now Pat. No. 10,574,564.

(60) Provisional application No. 62/489,332, filed on Apr. 24, 2017.

(51) Int. Cl.
*H04L 45/24* (2022.01)
*H04L 69/324* (2022.01)
*H04W 28/04* (2009.01)
*H04W 36/00* (2009.01)
*H04W 80/02* (2009.01)

(52) U.S. Cl.
CPC ....... *H04W 28/04* (2013.01); *H04W 36/0066* (2013.01); *H04W 80/02* (2013.01)

(58) Field of Classification Search
CPC ......... H04L 29/08; H04L 45/14; H04L 45/24; H04L 47/32; H04L 69/324; H04W 28/0205; H04W 28/0236; H04W 28/0278; H04W 28/04; H04W 28/065; H04W 36/0055; H04W 36/0066; H04W 72/08; H04W 76/15; H04W 76/28; H04W 76/27; H04W 80/02

See application file for complete search history.

(56) References Cited

U.S. PATENT DOCUMENTS

| | | | |
|---|---|---|---|
| 10,433,176 B2 | 10/2019 | Dudda et al. | |
| 10,477,430 B2 * | 11/2019 | Nagasaka | H04W 88/02 |
| 10,750,410 B2 * | 8/2020 | Vrzic | H04W 36/18 |
| 2013/0242859 A1 | 9/2013 | Celik et al. | |
| 2016/0088647 A1 * | 3/2016 | Yi | H04W 72/044 370/329 |
| 2016/0150440 A1 * | 5/2016 | Lee | H04W 24/10 455/422.1 |
| 2018/0279168 A1 | 9/2018 | Jheng et al. | |
| 2018/0279262 A1 | 9/2018 | Babaei et al. | |
| 2018/0310202 A1 | 10/2018 | Lohr et al. | |
| 2020/0145146 A1 | 5/2020 | Decarreau et al. | |

OTHER PUBLICATIONS

Nokia, Alcatel-Lucent Shanghi Bell, "Duplication Impacts to PDCP", 3GPP TSG-RAN WG2 Meeting #97bis, R2-1702642, Apr. 3-7, 2017, pp. 1-6.

Intel Corporation, "Packet duplication for URLLC in DC and CA deployment", 3GPP TSG-RAN WG2 NR Ad-hoc R2-1700336, Jan. 17-19, 2017, pp. 1-3.

LG Electronics Inc., "Introduction of Dual Connectivity in PDCP", 3GPP TSG-RAN WG2 #87bis, Tdoc R2-144350, Oct. 6-10, 2014, pp. 1-26.

Interdigital Communications, "Packet Duplication at PDCP", 3GPP TSG-RAN WG2 Meeting #97 R2-1701186, Feb. 13-17, 2017, pp. 1-2.

Rao et al., "Packet Duplication for URLLC in 5G: Architectural Enhancements and Performance", IEEE, Apr. 2018, pp. 1-9.

LG Electronics Inc. "Packet duplication in NR", 3GPP TSG-RAN WG2 NR Ad Hoc R2-1700423, Jan. 17-19, 2017, pp. 1-3.

Ericsson, "PDCP duplication", 3GPP TSG-RAN WG2 #101, Tdoc R2-1803159, Feb. 26-Mar. 2, 2018, pp. 1-10.

Intel Corporation, "Summary for WI Enhanced LTE-WLAN Aggregation (LWA)", 3GPP TSG RAN meeting #75, RP-170330, Mar. 6-9, 2017, pp. 1-2.

\* cited by examiner

DUPLICATING PDCP PDUS FOR A RADIO BEARER

CROSS-REFERENCE TO RELATED APPLICATIONS

This application is a continuation of U.S. patent application Ser. No. 16/799,420 entitled "Duplicating PDCP PDUs for a Radio Bearer" and filed on Feb. 24, 2020 for Joachim Loehr, Prateek Basu Mallick, and Ravi Kuchibhotla, which application is incorporated herein by reference. U.S. patent application Ser. No. 16/799,420 claims priority to U.S. patent application Ser. No. 15/961,510 entitled "Duplicating PDCP PDUs for a Radio Bearer" and filed on Apr. 24, 2018 for Joachim Loehr, Prateek Basu Mallick, and Ravi Kuchibhotla, which application is incorporated herein by reference. U.S. patent application Ser. No. 15/961,510 claims priority to U.S. Provisional Patent Application No. 62/489,332 entitled "Efficient scheme for Packet Duplication in NR" and filed on Apr. 24, 2017 for Joachim Loehr, Prateek Basu Mallick, and Ravi Kuchibhotla, which application is incorporated herein by reference.

FIELD

The subject matter disclosed herein relates to electronic communications and more particularly relates to duplicating Protocol Data Convergence Protocol ("PDCP") Protocol Data Units ("PDUs") for a radio bearer.

BACKGROUND

The following abbreviations and acronyms are herewith defined, at least some of which are referred to within the following description.

Third Generation Partnership Project ("3GPP"), Access and Mobility Management Function ("AMF"), Access Point Name ("APN"), Access Stratum ("AS"), Carrier Aggregation ("CA"), Clear Channel Assessment ("CCA"), Control Channel Element ("CCE"), Channel State Information ("CSI"), Common Search Space ("CSS"), Data Network Name ("DNN"), Data Radio Bearer ("DRB"), Downlink Control Information ("DCI"), Downlink ("DL"), Enhanced Clear Channel Assessment ("eCCA"), Enhanced Mobile Broadband ("eMBB"), Evolved Node-B ("eNB"), Evolved Packet Core ("EPC"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Globally Unique Temporary UE Identity ("GUTI"), Hybrid Automatic Repeat Request ("HARQ"), Home Subscriber Server ("HSS"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTE Advanced ("LTE-A"), Medium Access Control ("MAC"), Multiple Access ("MA"), Modulation Coding Scheme ("MCS"), Machine Type Communication ("MTC"), Massive MTC ("mMTC"), Mobility Management ("MM"), Mobility Management Entity ("MME"), Multiple Input Multiple Output ("MIMO"), Multipath TCP ("MPTCP"), Multi User Shared Access ("MUSA"), Non-Access Stratum ("NAS"), Narrowband ("NB"), Network Function ("NF"), Next Generation (e.g., 5G) Node-B ("gNB"), Next Generation Radio Access Network ("NG-RAN"), New Radio ("NR"), Policy Control & Charging ("PCC"), Policy Control Function ("PCF"), Policy Control and Charging Rules Function ("PCRF"), Packet Data Network ("PDN"), Packet Data Unit ("PDU"), PDN Gateway ("PGW"), Quality of Service ("QoS"), Quadrature Phase Shift Keying ("QPSK"), Radio Access Network ("RAN"), Radio Access Technology ("RAT"), Radio Resource Control ("RRC"), Receive ("RX"), Switching/Splitting Function ("SSF"), Scheduling Request ("SR"), Serving Gateway ("SGW"), Session Management Function ("SMF"), System Information Block ("SIB"), Transport Block ("TB"), Transport Block Size ("TBS"), Time-Division Duplex ("TDD"), Time Division Multiplex ("TDM"), Transmission and Reception Point ("TRP"), Transmit ("TX"), Uplink Control Information ("UCI"), Unified Data Management ("UDM"), User Entity/Equipment (Mobile Terminal) ("UE"), Uplink ("UL"), User Plane ("UP"), Universal Mobile Telecommunications System ("UMTS"), Ultra-reliability and Low-latency Communications ("URLLC"), and Worldwide Interoperability for Microwave Access ("WiMAX").

Some wireless communication systems support packet duplication for both user plane data, as well as control plane data, in order to increase the reliability of transmissions, i.e. by having the diversity gain. Duplication is a function of the PDCP layer, e.g., PDCP PDUs are duplicated. Services that benefit from duplication include URLLC or Signalling Radio Bearers ("SRBs").

BRIEF SUMMARY

Methods for duplicating PDCP PDUs for a radio bearer are disclosed. Apparatuses and systems also perform the functions of the methods. One method (e.g., of a user equipment) for duplicating PDCP PDUs for a radio bearer includes establishing, at a remote unit, a radio bearer to communicate with a mobile communication network. Here, the radio bearer includes a PDCP protocol entity, a first RLC protocol entity and a second RLC protocol entity being associated with said PDCP protocol entity, a first logical channel being associated with said first RLC protocol entity, and a second logical channel being associated with said second RLC protocol entity. The method includes receiving, at the remote unit, a first control signal from the mobile communication network. The method includes submitting, from the PDCP entity, a PDCP data PDU to the first RLC entity for transmission and, in response to the first control signal, submitting, from the PDCP entity, the PDCP data PDU to the second RLC entity for transmission. The method includes receiving, at the PDCP entity and from one of the first RLC entity and the second RLC entity, a confirmation of successful delivery of the PDCP data PDU and indicating to the other one of the first RLC entity and the second RLC entity to discard a duplicate PDCP data PDU corresponding to the successfully delivered PDCP data PDU.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
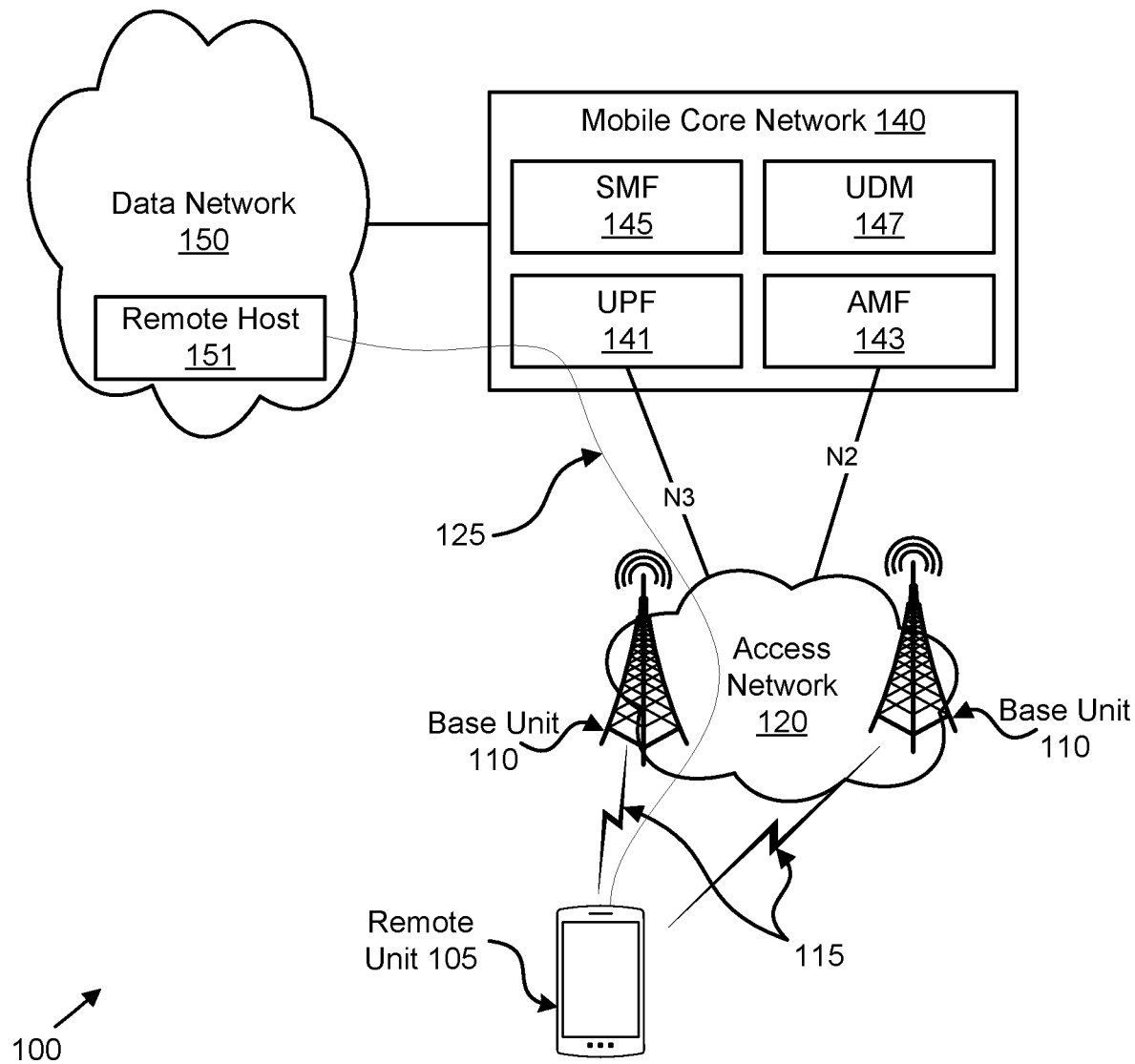
FIG. 1 is a schematic block diagram illustrating one embodiment of a wireless communication system for duplicating PDCP PDUs for a radio bearer.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

FIG. 1 depicts a wireless communication system 100 for duplicating PDCP PDUs for a radio bearer, according to embodiments of the disclosure. In one embodiment, the wireless communication system 100 includes at least one remote unit 105, an access network 120 containing at least two base units 110, wireless communication links 115, and a mobile core network 140. Even though a specific number of remote units 105, access networks 120, base units 110, wireless communication links 115, and mobile core networks 140 are depicted in FIG. 1, one of skill in the art will recognize that any number of remote units 105, access networks 120, base units 110, wireless communication links 115, and mobile core networks 140 may be included in the wireless communication system 100. In another embodiment, the access network 120 contains one or more WLAN (e.g., Wi-Fi™) access points.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication a signals. Furthermore, the UL and DL communication signals may be carried over the wireless communication links 115.

In some embodiments, the remote units 105 may communicate with a remote host 151 via a data path 125 that passes through the mobile core network 140 and a data network 150. For example, a remote unit 105 may establish a PDU connection (or a data connection) to the data network 150 via the mobile core network 140 and the access network 120. The mobile core network 140 then relays traffic between the remote unit 105 and the remote host 151 using the PDU connection to the data network 150.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the access network 120, that may include one or more controllers communicably coupled to one or more corresponding base units 110. These and other elements of the radio access network are not illustrated, but are well known generally by those having ordinary skill in the art. The base units 110 connect to the mobile core network 140 via the access network 120.

The base units 110 may serve a number of remote units 105 within a serving area, for example, a cell or a cell sector via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a data network 150, like the Internet and private data networks, among other data networks. Each mobile core network 140 may belong to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple control plane functions including, but not limited to, an Access and Mobility Management Function ("AMF") 143, a Session Management Function ("SMF") 145, and a Policy Control Function ("PCF"). Additionally, the mobile core network 140 includes a user plane function ("UPF") 141 and a Unified Data Management ("UDM") 147. Although specific numbers and types of network functions are depicted in FIG. 1, one of skill in the art will recognize that any number and type of network functions may be included in the mobile core network 140.

Disclosed herein are methods, systems, and apparatuses for efficient activation/deactivation of PDCP duplication for both CA- and DC-based architectures. To efficiently activate and/or deactivate packet duplication (e.g., PDCP duplication), a base unit 110 signals to the remote unit 105, e.g., a first control signal. This signaling may be PDCP control signaling, MAC control signaling, or RRC signaling. For 3GPP networks, the 5G radio RAT (referred to as New Radio, "NR") supports packet duplication for data on both the user plane and the control plane, e.g. in order to increase the reliability of transmissions by having the diversity gain. As mention above, this packet duplication is a function of the PDCP layer, such that PDCP PDUs are duplicated.

PDCP duplication benefits services such as URLLC, where transmission reliability and latency enhancements are two key aspects. Moreover, redundancy/diversity schemes in Carrier Aggregation ("CA") scenarios can be used to reach the reliability and latency requirements of URLLC. For URLLC, two independent transmission channels on different carriers may be needed for extreme-reliability cases such as error rates of $10^{-5}$ to $10^{-9}$ within a given latency bound. Here, duplication based on CA is a tool available to the scheduler to further improve the transmission reliability. However, where reliability on one of the carriers cannot be guaranteed, it is thus beneficial to have further carrier(s) available. As an example, such a situation may be due to a temporary outage/fading dip, due to unanticipated change or wrong channel state information.

Packet duplication may be also applied based on Dual Connectivity ("DC") architecture, e.g., split bearer operation with PDCP duplication. In a general sense, packet duplication may be used together with different diversity schemes involving more than one radio link to serve a UE. While the below embodiments focus on DC and CA scenarios, the present disclosure is not intended to be limited to those implementations.

Generally, packet duplication is limited to those situations where the extra reliability is needed, e.g., dynamic activation/deactivation. Here, PDCP control signaling or MAC control signaling (e.g., MAC control element ("CE")) may be used to activate/deactivate the PDCP duplication. Beneficially, this also reduces the overhead of activation/deactivation of the PDCP duplication. Currently, there are no procedures for configuring PDCP duplication in both CA- and DC-based architecture, much less procedures for activating/deactivating duplication in a flexible, dynamic manner.

In one embodiment, the remote unit 105 is configured with a split bearer, e.g., for dual connectivity. In such embodiments, the default state for PDCP duplication at the split bearer may be deactivated, wherein the base unit 110 explicitly activates PDCP duplication by sending the first control signal. In another embodiment, the remote unit 105 communicates with the access network 120 using carrier aggregation, the remote unit 105 being configured with at least one bearer which has a PDCP entity which is associated with two logical channels/RLC entities being mapped to different serving cells. In such embodiments, the default state for PDCP duplication of the bearer may be deactivated, wherein the base unit 110 explicitly activates PDCP duplication by sending the first control signal.

In one embodiment when duplication is activated the remote unit 105 removes PDCP PDUs from transmission buffer associated with one logical channel/RLC entity which were already successfully transmitted via the other logical channel/RLC entity, e.g., in order to avoid that the transmission buffer is piling up. The removal (discarding) of packets may be based on received RLC status reports, according to one embodiment. Here, a RLC layer at the remote unit 105 informs a PDCP layer about the successfully transmitted PDCP PDUs. The PDCP layer may then send a PDCP discard notification to the other RLC entity.

Alternatively, the removal/discarding of packets may be based on received PDCP status reports. In such embodiments, the remote unit 105 sends PDCP status reports to the base unit 110 for DL, the base unit 110 using this information to discarding packets which have been already successfully received by the remote unit 105 from the DL transmit buffer. Similarly, for UL, the PDCP layer in the remote unit 105 receives a PDCP status report from the base unit 110 and indicates to the appropriate RLC entity to discard packets which have been already successfully transmitted (e.g., by the other RLC entity). In one implementation, the remote unit 105 lets the PDCP discard timer expire for those PDCP SDUs which are indicated in the PDCP status report as successfully transmitted and subsequently sends the discard notification to the RLC layer correspondingly in response to the PDCP discard timer expiry.

Figure 2:
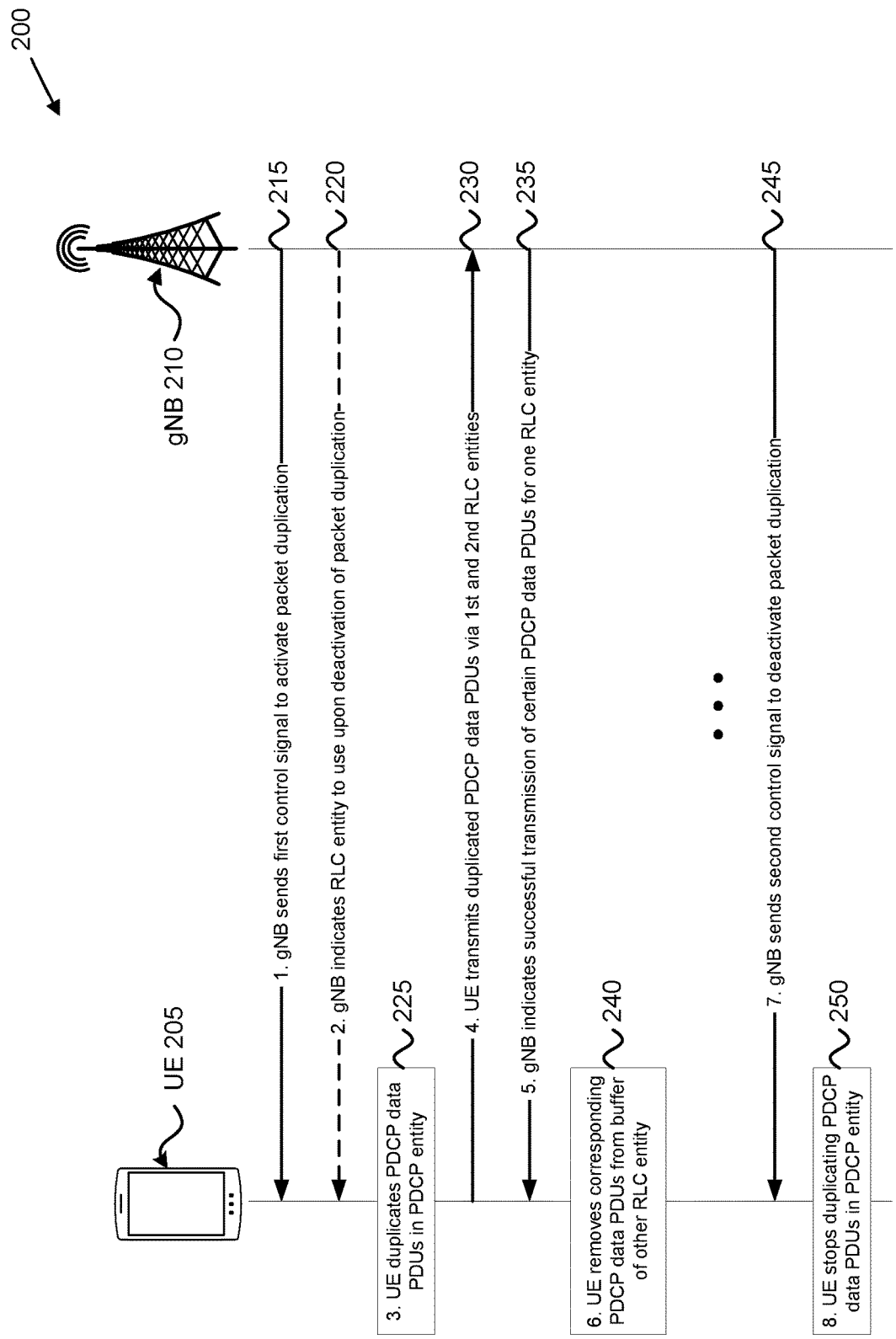
FIG. 2 is a schematic block diagram illustrating another embodiment of a network procedure for duplicating PDCP PDUs for a radio bearer.

FIG. 2 depicts a network procedure 200 for duplicating PDCP PDUs for a radio bearer, according to embodiments of the disclosure. The network procedure 200 involves a UE 205 and a network entity, here depicted as the gNB 210. The UE 205 may be one embodiment of the remote unit 105 described above. Likewise, the gNB 210 may be one embodiment of the base unit 110 described above.

Here, it is assumed that the UE 205 has established a radio bearer with the gNB 210. Here, the radio bearer may include a PDCP entity, a first RLC entity and a second RLC entity associated with the PDCP entity, a first logical channel being associated with the first RLC entity, and a second logical channel associated with the second RLC protocol entity. In one embodiment, the radio bearer includes a split bearer at the UE 205 (e.g., for dual connectivity with the gNB 210 and another network entity (not shown)). In another embodiment, the radio bearer may be used in a carrier aggregation deployment.

The network procedure 200 begins with the gNB 210 sending the UE 205 a first control signal used to activate the packet duplication (see signaling 215) for said radio bearer. Here, the first control signal may be a PDCP control signal, a MAC control signal, and/or an RRC signal. As noted above, packet duplication may be deactivated as a default, thus requiring an explicit signal (here, the first control signal) from the gNB 210 to activate duplication for a radio bearer.

In certain embodiments, the gNB 210 optionally sends the UE 205 an indication of which RLC entity to use for transmission of PDCP PDUs upon deactivation of packet duplication (see signaling 220). In one embodiment, the unused RLC entity is deactivated until duplication is again activated. In another embodiment, the unused RLC entity becomes available for transmission of (non-duplicated) data upon deactivation of the packet duplication.

In response to the first control signal, the UE 205 begins packet duplication by duplicating PDCP data PDUs in the PDCP entity (see block 225). Here, copies of the same PDCP data PDU are send to the first and second RLC entities. Put another way, the PDCP PDUs received by the first and second RLC entities contain the same information. Accordingly, the RLC entities further process the duplicated packets for transmission. Here, routing of PDCP data PDUs to both RLC entities may be based on received UL grants. As depicted, the UE 205 transmits the duplicated PDCP data PDUs to the gNB 210 via the first and second RLC entities (see messaging 230).

In various embodiments, the gNB 210 indicates successful transmission of (certain) PDCP data PDUs to an RLC entity (see signaling 235). Here, the gNB 210 may send an RLC status report indicating the successful transmission of RLC PDUs corresponding to the PDCP data PDUs. Alternatively, the gNB 210 may send a PDCP status report to indicate successful transmission of PDCP data PDUs.

In response to successfully transmitting PDCP data PDUs via one RLC entity, the UE 205 removes corresponding PDCP data PDUs from the buffer of the other RLC entity (see block 240). In some embodiments, successful transmission is indicated via RLC status report and the PDCP entity receives the indication of successful delivery from the RLC entity and signals to the other RLC entity to discard the corresponding PDCP data PDUs. In other embodiments, the PDCP entity receives the indication of successful delivery via PDCP status report. Note that the UE 205 continues to send duplicated PDCP data PDUs to the gNB 210 and continues to receive indications of successful delivery.

At some later point in time, the gNB 210 sends a second control signal to the UE 205 to deactivate the packet duplication (see signaling 245). Again, PDCP control signaling, MAC control signaling, and/or RRC signaling may be used to send the second control signal. In response to receiving the second control signal, the UE 205 stops duplicating PDCP data PDUs in the PDCP entity of the radio bearer (see block 250). Note that the UE 205 uses the RLC entity/Logical channel (previously) configured for PDCP data transmission after deactivating packet duplication.

In certain embodiments, the UE 205 cancels a scheduling request triggered by data arrival of the RLC entity/logical channel which is configured to be not used for PDCP data transmission when duplication is deactivated, responsive to the second control signal. In certain embodiments, the UE 205 cancels a buffer status report ("BSR") triggered by data arrival of the logical channel which is configured to be not used for PDCP data transmission when duplication is deactivated, responsive to the second control signal. Moreover, a MAC/HARQ entity in the UE 205 may discard packets associated with the deactivated RLC entity. In certain embodiments, the UE 205 flushes the RLC transmission buffer of the deactivated RLC entity as a response to receiving the second control signal.

Figure 3:
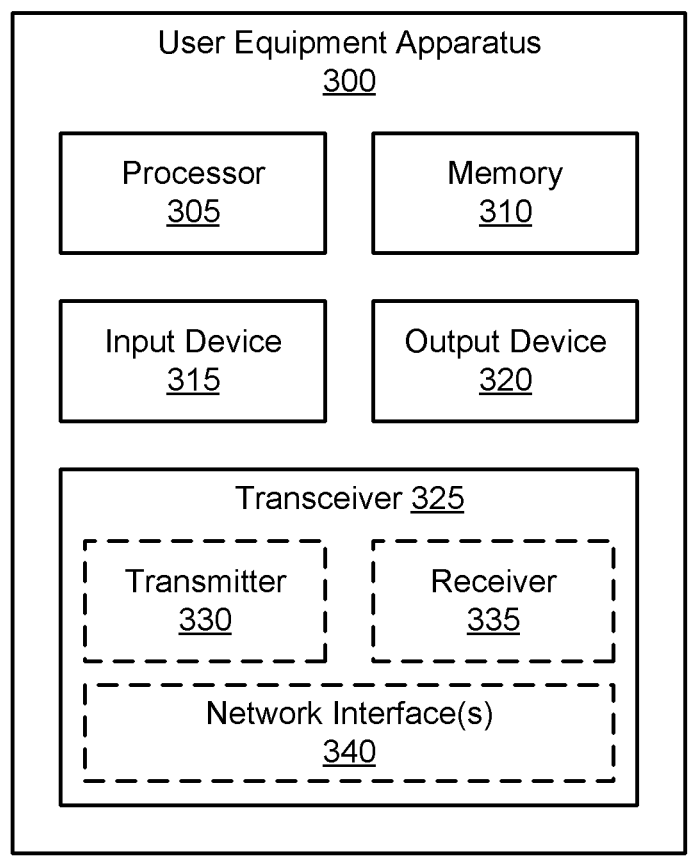
FIG. 3 is a schematic block diagram illustrating one embodiment of a user equipment apparatus for duplicating PDCP PDUs for a radio bearer.

FIG. 3 depicts one embodiment of a user equipment apparatus 300 that may be used for duplicating PDCP PDUs for a radio bearer, according to embodiments of the disclosure. The user equipment apparatus 300 may be one embodiment of the remote unit 105 and/or UE 205. Furthermore, the user equipment apparatus 300 may include a processor 305, a memory 310, an input device 315, an output device 320, and a transceiver 325. In some embodiments, the input device 315 and the output device 320 are combined into a single device, such as a touch screen. In certain embodiments, the user equipment apparatus 300 does not include any input device 315 and/or output device 320.

As depicted, the transceiver 325 includes at least one transmitter 330 and at least one receiver 335. Additionally, the transceiver 325 may support at least one network interface 340. Here, the at least one network interface 340 facilitates communication with a eNB or gNB (e.g., using the Uu interface). Additionally, the at least one network interface 340 may include an interface used for communications with an UPF and/or AMF.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the output device 320, and the transceiver 325.

In some embodiments, the processor 305 establishes a radio bearer to communicate with a mobile communication network. Here, the radio bearer includes a PDCP protocol entity, a first RLC protocol entity and a second RLC protocol entity being associated with said PDCP protocol entity, a first logical channel being associated with said first RLC protocol entity, and a second logical channel being associated with said second RLC protocol entity. In various embodiments, the radio bearer may include a MAC entity associated with the first RLC protocol entity and a MAC entity associated with the second RLC protocol entity.

In response to receiving a first control signal, the processor 305 begins packet duplication. Here, the processor 305 duplicates PDCP data PDUs in the PDCP protocol entity in response to the first control signal. The duplicated PDCP data PDUs are submitted to the first RLC protocol entity and the second RLC protocol entity for transmission. In addition, the processor 305 indicates to the first RLC protocol entity to discard one or more duplicated PDCP data PDUs in response to receiving confirmation of successful transmission of a corresponding one or more PDCP data PDUs by the second RLC protocol entity and also indicates to the second protocol entity to discard one or more duplicated PDCP data PDUs in response to receiving confirmation of successful transmission of a corresponding one or more PDCP data PDUs by the first RLC protocol entity.

In some embodiments, the one RLC protocol entity indicates the successful delivery of the corresponding one or more PDCP data PDUs to the PDCP protocol entity based on a RLC status report received from the mobile communication network. In response to receiving said indication of successful delivery, the PDCP protocol entity indicates, to the other of the first and second RLC protocol entities, to discard the one or more duplicated PDCP data PDUs. In certain embodiments, the processor 305 discards one or more PDCP data PDUs in the appropriate RLC entity in response to receiving the discard indication from the PDCP protocol entity. In some embodiments, the processor 305 discards the one or more PDCP data PDUs in the one of the first RLC protocol entity and the second RLC protocol entity based on a PDCP status report received from the mobile communication network.

In various embodiments, the processor 305, in response to the first control signal, indicates an amount of data packets (e.g., PDCP data PDUs) in the PDCP protocol entity to the MAC entity associated with the first RLC protocol entity and to the MAC entity associated with the second RLC protocol entity for reporting the buffer status of the logical channels associated with the first RLC protocol entity and second RLC protocol entity. Here, the same amounts of data packets are indicated for both RLC entities.

In some embodiments, the first control signal instructs the user equipment apparatus 300 to begin duplicating PDCP data PDUs. In various embodiments, the first control signal is one of: a PDCP control signal, a MAC control signal, and an RRC signal. At some time after receiving the first control signal, the processor 305 may further receive a second control signal that instructs the user equipment apparatus 300 to stop duplicating PDCP data PDUs. Here it is assumed that the user equipment apparatus 300 is to use the first RLC protocol entity for transmission of PDCP data PDUs upon deactivating packet duplication.

In one embodiment, the processor 305 may cancel a scheduling request associated with the second logical channel in response to the second control signal. Here, the scheduling request is triggered by data arrival for the second logical channel. In another embodiment, the processor 305 may cancel a buffer status report associated with the second logical channel in response to the second control signal. Here, the buffer status report is triggered by data arrival for the second logical channel.

In certain embodiments, the user equipment apparatus 300 communicates with the mobile communication network using dual connectivity. In the dual connectivity use case, each of the RLC protocol entities belongs to a different cell group in the mobile communication network. Additionally, the MAC entity associated with the first RLC protocol entity is a first MAC entity and the MAC entity associated with the second RLC protocol entity is a second MAC entity different than the first. In such embodiments, the processor 305 indicates a same amount of PDCP data PDUs in the PDCP protocol entity to the first MAC entity and to the second MAC entity for reporting the buffer status of the first logical channel and the second logical channel.

Also for the dual connectivity use case, establishing the radio bearer may include establishing a split bearer in the user equipment apparatus. Here, the split bearer supports the dual connectivity. In certain embodiments, the first control signal comprises an indication to duplicate PDCP data PDUs over the split bearer. In certain embodiments, the processor sets an uplink data split threshold to a value of zero in response to receiving the first control signal and sets the uplink data split threshold to infinity in response to receiving a second control signal, where the first control signal activates packet duplication and the second control signal deactivates packet duplication.

In certain embodiments, the user equipment apparatus 300 communicates with the mobile communication network using carrier aggregation. In the carrier aggregation use case, the first RLC protocol entity and the second RLC protocol entity belong to the same cell group. Moreover, each of the RLC protocol entities is associated with the same (e.g., shared) MAC entity. In such embodiments, the processor 305 indicates the same amount of PDCP data PDUs in the PDCP protocol entity to the MAC entity for reporting the buffer status of the first logical channel and the second logical channel.

In further embodiments, the processor 305 receives a second control signal and deactivates packet duplication. Here, in response to the second control signal, the processor 305 may indicate an amount of PDCP data PDUs available for transmission in the PDCP protocol entity to the MAC entity associated with the second RLC protocol entity for reporting buffer status of the second logical channel to zero. Note here that the first RLC protocol entity continues sending packets (e.g., PDCP data PDUs) after deactivating packet duplication. Moreover, processor 305 may receive a third control signal prior to the second control signal, the third control signal indicating to use the first RLC protocol entity for transmission of PDCP data PDUs upon deactivating packet duplication.

In some embodiments, the processor 305 initializes a token bucket status for a previously inactive logical channel (e.g., in response to the first control signal). Here, the amount of tokens in the token bucket may be periodically incremented. Moreover, the previously inactive logical channel may be one of the first logical channel and the second logical channel. In response to receiving the second control signal deactivating packet duplication, the processor 305 does not maintain a token bucket associated with the second logical channel.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to duplicating PDCP PDUs for a radio bearer, for example storing indications to activate/deactivate packet duplication, indications of successful transmission of PDCP data PDUs, and the like. In certain embodiments, the memory 310 also stores program code and related data, such as an operating system or other controller algorithms operating on the user equipment apparatus 300 and one or more software applications.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The output device 320, in one embodiment, may include any known electronically controllable display or display device. The output device 320 may be designed to output visual, audible, and/or haptic signals. In some embodiments, the output device 320 includes an electronic display capable of outputting visual data to a user. For example, the output device 320 may include, but is not limited to, an LCD display, an LED display, an OLED display, a projector, or similar display device capable of outputting images, text, or the like to a user. As another, non-limiting, example, the output device 320 may include a wearable display such as a smart watch, smart glasses, a heads-up display, or the like. Further, the output device 320 may be a component of a smart phone, a personal digital assistant, a television, a table computer, a notebook (laptop) computer, a personal computer, a vehicle dashboard, or the like.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, all or portions of the output device 320 may be located near the input device 315.

The transceiver 325 communicates with one or more network functions of a mobile communication network. The transceiver 325 operates under the control of the processor 305 to transmit messages, data, and other signals and also to receive messages, data, and other signals. For example, the processor 305 may selectively activate the transceiver (or portions thereof) at particular times in order to send and receive messages. The transceiver 325 may include one or more transmitters 330 and one or more receivers 335.

Figure 4:
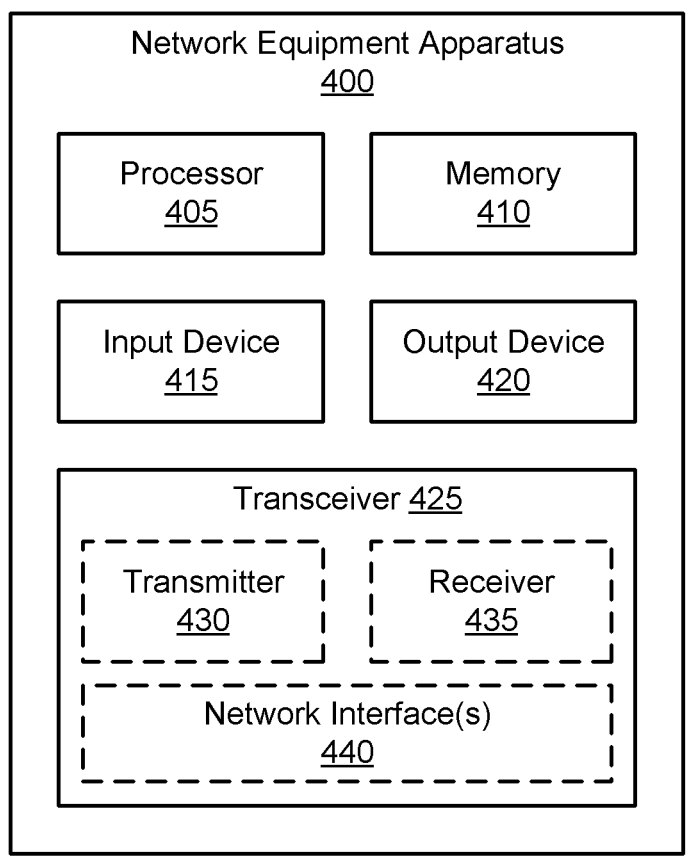
FIG. 4 is a schematic block diagram illustrating one embodiment of a network equipment apparatus for duplicating PDCP PDUs for a radio bearer.

FIG. 4 depicts one embodiment of a network equipment apparatus 400 that may be used for duplicating PDCP PDUs for a radio bearer, according to embodiments of the disclosure. The network equipment apparatus 400 may be one embodiment of the base unit 110 and/or the gNB 210. Furthermore, the network equipment apparatus 400 may include a processor 405, a memory 410, an input device 415, an output device 420, and a transceiver 425. In some embodiments, the input device 415 and the output device 420 are combined into a single device, such as a touch screen. In certain embodiments, the network equipment apparatus 400 does not include any input device 415 and/or output device 420.

As depicted, the transceiver 425 includes at least one transmitter 430 and at least one receiver 435. Additionally, the transceiver 425 may support at least one network interface 440. Here, the at least one network interface 440 facilitates communication with a remote unit 105, such as the UE 205, with other network functions in a mobile core network 140, such as the UPF 141, AMF 143, and the like.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In various embodiments, the processor 405 establishes a radio bearer to communicate with a UE, such as the UE 205. Here, the radio bearer may include a PDCP protocol entity, a first RLC protocol entity and a second RLC protocol entity being associated with said PDCP protocol entity, a first logical channel being associated with said first RLC protocol entity, and a second logical channel being associated with said second RLC protocol entity.

In some embodiments, the processor 405 transmits a first control signal to a UE, the first control signal instructing the UE to begin packet duplication. In certain embodiments, the first control signal is one of: a PDCP control signal, a MAC control signal, and an RRC signal. In response to transmitting the first control signal, the processor 405 receives duplicated packet (e.g., duplicated PDCP data PDUs from the UE. In addition, the processor 405 indicates to the UE of successful transmission of one or more UL PDCP data PDUs.

In certain embodiments, the processor 405 further receives from the UE an indication of successfully received DL PDCP data PDUs. Where packet duplication is used on the DL, the processor 405 may discard from the first RLC protocol entity one or more PDCP data PDUs in the first RLC protocol entity in response to successful transmission of corresponding one or more the second RLC protocol entity and vice versa.

At some time after sending the first control signal, the processor 405 may further send a second control signal that instructs the UE to stop duplicating PDCP data PDUs. In various embodiments, the processor 405 sends an indication to the UE of which RLC protocol entity to use for transmission of PDCP data PDUs upon deactivating packet duplication.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to duplicating PDCP PDUs for a radio bearer, for example storing indications to activate/deactivate packet duplication, indications of successful transmission of PDCP data PDUs, and the like. In certain embodiments, the memory 410 also stores program code and related data, such as an operating system or other controller algorithms operating on the network equipment apparatus 400 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, all or portions of the output device 420 may be located near the input device 415.

The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435.

Figure 5:
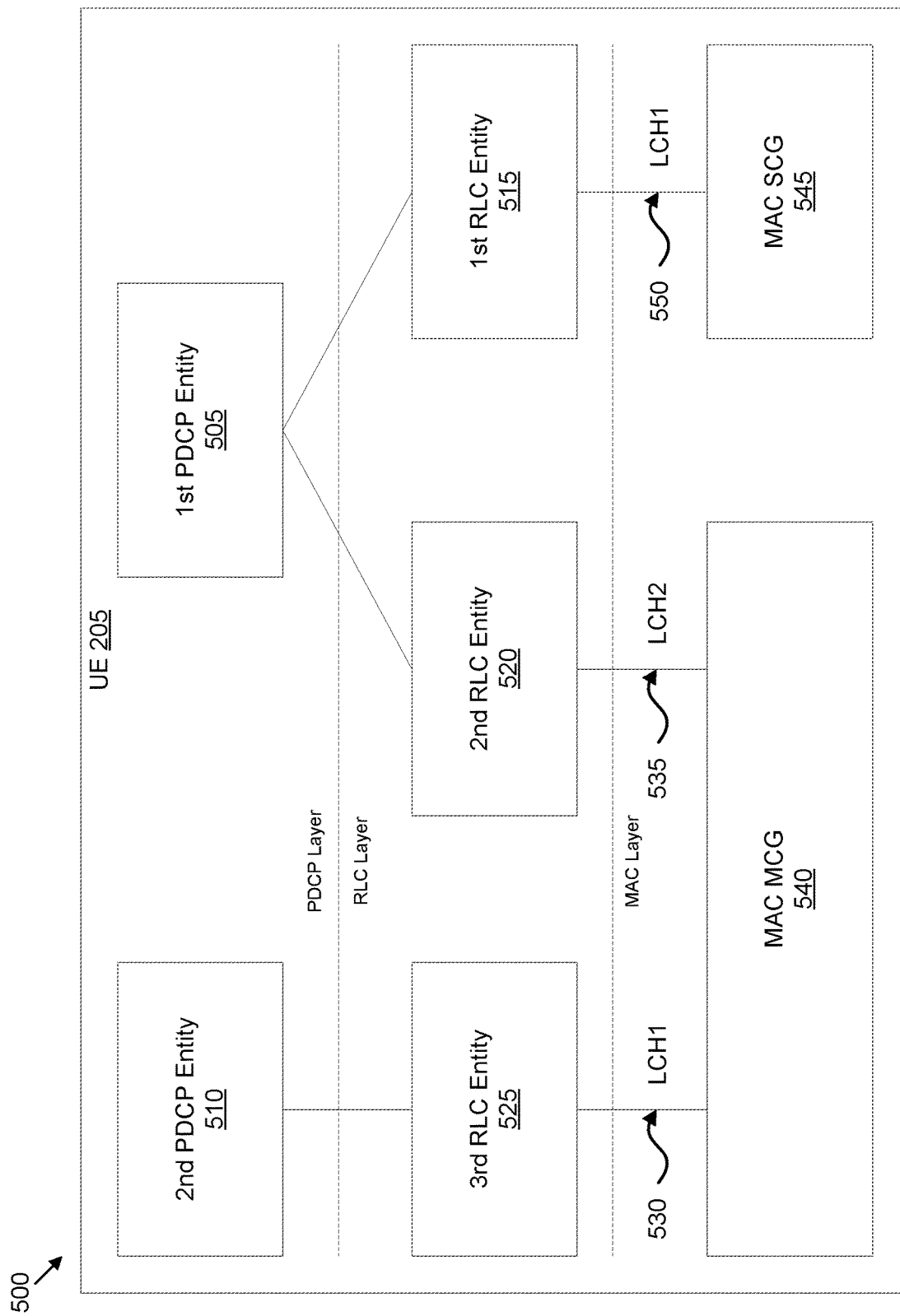
FIG. 5 is a diagram illustrating one embodiment of a protocol stack for duplicating PDCP PDUs for a radio bearer in a dual connectivity environment.

FIG. 5 depicts a protocol stack 500 for duplicating PDCP PDUs for a radio bearer in a dual connectivity environment, according to embodiments of the disclosure. Here, the protocol stack 500 is depicted as a part of the UE 205. As depicted, the protocol stack 500 includes a first PDCP entity 505 and a second PDCP entity 510. Here, there is one PDCP entity per radio bearer, such that the first PDCP entity 505 belongs to a first radio bearer and the second PDCP entity 510 belongs to a second radio bearer. The PDCP entities 505-510 are located in a PDCP layer of the protocol stack 500 and perform PDCP functions, including (but not limited to) header compression, security (integrity protection and ciphering), and support for reordering and retransmission, e.g., during handover. Note that the PDCP layer processes RRC messages in the control plane and IP packets in the user plane.

The protocol stack 500 also includes a first RLC entity 515, a second RLC entity 520, and a third RLC entity 525. There may be multiple RLC entities per radio bearer. In the depicted embodiment, the first RLC entity 515 and second RLC entity 520 belong to the same radio bearer as the first PDCP entity 505. Note that the third RLC entity 525 is associated with the second PDCP entity 510. The RLC entities 515-525 are located in a RLC layer of the protocol stack 500 and perform RLC functions, including (but not limited to) segmentation and reassembly packets in to adapt them to the size suitable for radio interface. Note that the RLC layer exists below the PDCP layer and above the MAC layer. The protocol stack 500 includes three different logical channels, a first logical channel 530 on a MAC entity 540 associated with the master cell group (the "MAC MCG") associated with the third RLC entity 525 and a second logical channel 535 associated with the second RLC entity 520. The protocol stack 500 also includes a first logical channel 550 on a MAC entity 545 associated with a secondary cell group (the "MAC SCG") associated with the first RLC entity 515.

In the depicted embodiment, the UE 205 is configured with a split bearer, thus having a MAC entity 540 associated with a master cell group and a MAC entity 545 associated with a secondary cell group. Here, the first RLC entity 515 is associated with the MAC SCG 545, while the second RLC entity 520 and third RLC entity 525 are associated with the MAC MCG 540. The MAC entities 540-545 are located in a MAC layer of the protocol stack 500 and perform MAC functions, including (but not limited to) multiplexing between logical channels and (PHY) transport channels. The MAC entities 540-545 construct transport blocks ("TBs") from SDUs received from the RLC layer. As used herein, a service data unit ("SDU") refers to the data received from a higher layer and a protocol data unit ("PDU") refers to the data passed to a lower layer. Thus, the PDCP entities 505-510 output PDCP PDUs, which are referred to as RLC SDUs when received at the RLC entities 515-525. Likewise, the RLC entities 515-525 output RLC PDUs, which are referred to as MAC SDUs when received at the corresponding MAC entities.

In various embodiments, PDCP duplication is used in a DC-based architecture, such as that scenario supported by the protocol stack 500. Here, a network entity ("NE") such as a base unit or gNB configures a split bearer to the UE 205. At the network side, the PDCP layer of the split bearer may be located either in the Master Node ("MN") or in the Secondary Node ("SN"). Moreover, the UE 205 may be further configured with Master Cell Group ("MCG") bearer(s) or Secondary Cell Group ("SCG") bearer(s). Here, the MCG bearers are multiplexed (and demultiplexed) by the MAC MCG 540, while the SCG bearers are multiplexed (and demultiplexed) by the MAC SCG 545.

The NE, e.g., an MN or an SN, signals to the UE 205 the PDCP duplication configuration, e.g., activation/deactivation of duplication. Note that the default state for duplication is deactivated. Accordingly, the NE, e.g., either MN or SN, needs to explicitly activate PDCP duplication when a split bearer used for duplication is configured. As discussed above, this signaling may be PDCP control signaling or MAC control signaling. Alternatively, RRC signaling may be used.

According to one embodiment, the NE configures the UE 205 with one radio link, e.g., either the MCG or SCG, which the UE 205 is to use for data transmission when PDCP duplication is deactivated. In certain embodiments, this configuration may be done by RRC signaling. For example, the ul-DataSplitDRB-ViaSCG Information Element ("IE") may be used to define whether the UE 205 sends UL data via SCG or MCG of a configured split bearer.

For the case that the NE activates PDCP duplication, the UE 205 reports the same PDCP buffer occupancy of the split bearer used for duplication within the buffer status report (BSR) to both MAC entities 540-545 respectively to both MN and SN. Here, routing of PDCP data PDUs to the first and second RLC entities 515-520 may be based on received UL grants. For example, when a UL grant is received for one CG, the corresponding PDCP PDUs are generated, duplicated, and (optionally) forwarded to the first and second RLC entities 515-520.

Note that the UE 205 and/or NE may control PDCP PDU duplication using a threshold associated with the split bearer, such as the threshold ul-DataSplitThreshold. Here, when the data available for transmission in PDCP is larger than or equal to ul-DataSplitThreshold, then the UE 205 reports to both (all) network entities the same PDCP data amount for the purpose of buffer status reporting.

In some embodiments, the UE 205 sets ul-DataSplitThreshold to zero in response to receiving the first control signal from the NE, e.g. either MN or SN, activating the duplication. Setting ul-DataSplitThreshold to zero ensures that the data in the first PDCP entity 505 is reported to both network nodes, i.e., both the MN and SN. Here, the UE 205 indicates the data available for transmission in PDCP to both the MAC entity 545 configured for SCG and the MAC entity 540 configured for MCG. In other embodiments, the NE, e.g. either MN or SN, configures the ul-DataSplitThreshold to zero when activating PDCP duplication. The configuration may be signalled by PDCP control signalling or MAC control signalling or alternatively RRC signalling.

Transmission of the PDCP PDUs takes place according to the received uplink grants. For example, the UE 205 submits the generated PDCP PDUs to either the first RLC entity 515 configured for SCG or the second RLC entity 520 configured for MCG, whichever the PDUs were requested by. Further, the UE 205 may duplicate the generated PDCP PDUs and may submit them to the other RLC entity.

In some embodiment, the UE 205 sets ul-DataSplitThreshold to infinity in response to receiving a second control signal from the NE directing the UE 205 to deactivate duplication. Here, setting ul-DataSplitThreshold to infinity ensures that only one radio link, e.g., as configured by ul-DataSplitDRB-ViaSCG, is used for data transmissions. In certain embodiments the UE 205 flushes the RLC transmission buffer of the "inactive" RLC entity, i.e., RLC entity of inactive radio link. Here, flushing the PDCP PDUs/RLC PDUs stored in the transmission buffer ensures that those PDUs are not retransmitted, once the radio link is reactivated (when duplication is activated again), as this may result in TCP reducing the link rate and/or HFN desynchronization. In other embodiments, the RLC entity of the "inactivated" radio link is re-established when duplication is deactivated.

In some embodiment, the logical channels 530, 535, and 550 may be associated with token buckets, used to control uplink transmissions. Here, the MAC entities 540-545 maintain a variable Bj for each logical channel j, Bj representing the status of the token bucket for that logical channel, e.g., the amount of tokens accumulated for that logical channel. In various embodiments, the token bucket status Bj is initialized to zero when the related logical channel is established, and incremented by the product PBR×TTI duration for each TTI, where PBR is Prioritized Bit Rate of logical channel j. In certain embodiments, the UE 205 initializes Bj for a previously "inactive" logical channel j to zero when duplication is activated (e.g., sets the number of tokens in the bucket of logical channel j to zero). In certain embodiments, the value of Bj may be initialized to zero for an "inactive" logical channel when duplication is deactivated. In various embodiments, the UE 205 does not maintain the token bucket status of a "inactive" logical channel j when duplication is deactivated, e.g., the UE 205 stops incrementing the token bucket status Bj.

In certain embodiments, the UE 205 cancels, if any, triggered Scheduling Requests and/or buffer status reports caused by data arrival of the "inactivated" logical channel when duplication is deactivated. Note that the Scheduling Request(s) and/or buffer status report(s) are triggered by data arrival for the now "inactivated" logical channel.

In one embodiment the RLC entity of the inactive radio link/cell group, e.g., "leg" of the split bearer, is suspended when duplication is deactivated. Here, the corresponding MAC entity does not report buffer status information for the suspended leg of the split bearer. In certain embodiments, the UE 205 flushes the RLC buffer or alternatively re-establishes the "suspended" RLC entity. In one embodiment the MAC entity (or HARQ entity) discards packets which are received for a RLC entity of an inactive leg of a split bearer when duplication is deactivated. RLC PDUs of an "inactive" RLC entity/logical channel might be still subject to HARQ retransmission and therefore arrive after having disabled duplication.

Figure 6:
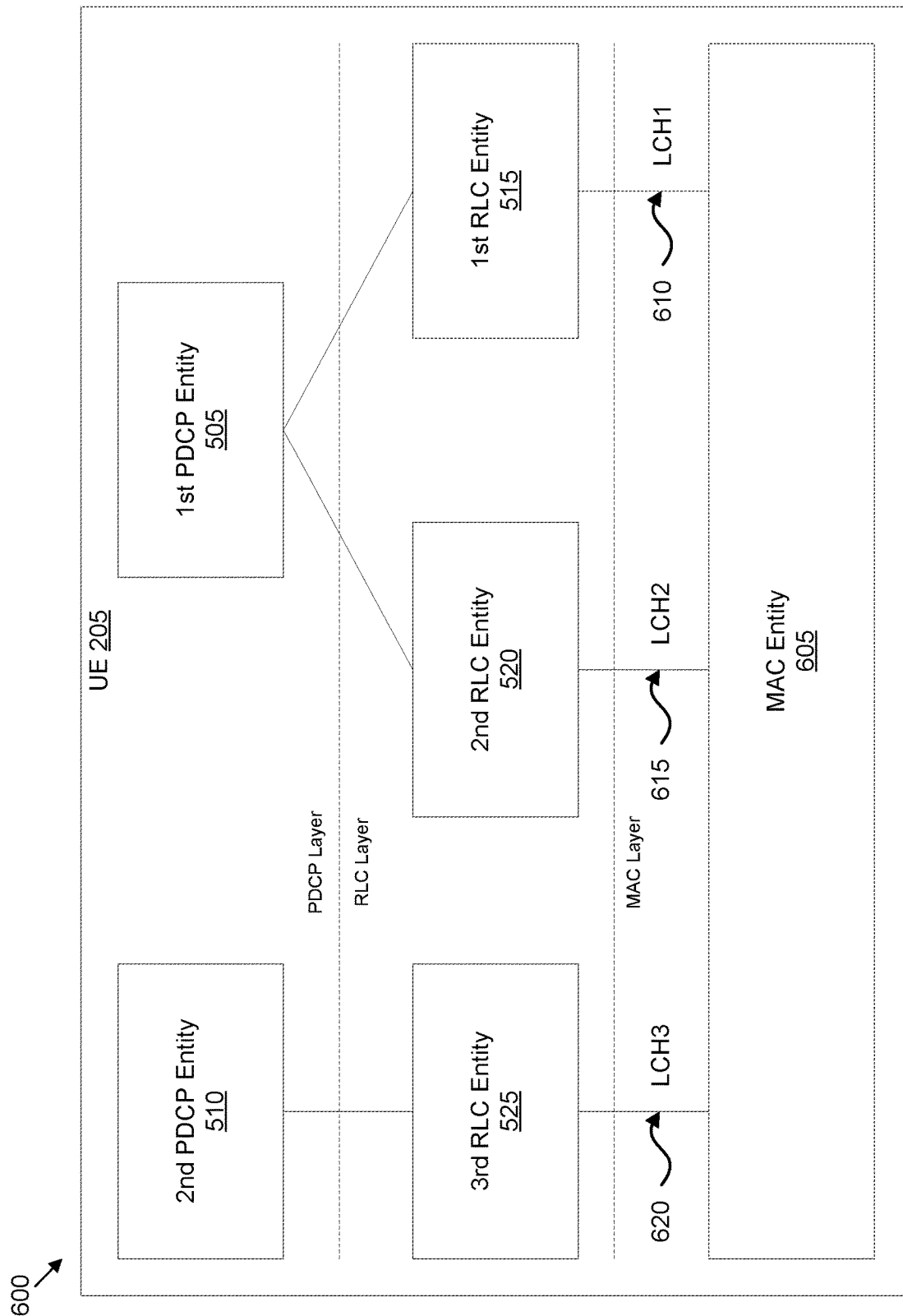
FIG. 6 is a diagram illustrating one embodiment of a protocol stack for duplicating PDCP PDUs for a radio bearer in a carrier aggregation environment.

FIG. 6 depicts a protocol stack 600 for duplicating PDCP PDUs for a radio bearer in a carrier aggregation environment, according to embodiments of the disclosure. Here, the protocol stack 600 is depicted as a part of the UE 205. As depicted, the protocol stack 600 includes a first PDCP entity 505 and a second PDCP entity 510. Here, there is one PDCP entity per radio bearer. The PDCP entities 505-510 are located in a PDCP layer of the protocol stack 600 and perform PDCP functions.

The protocol stack 600 also includes a first RLC entity 515, a second RLC entity 520, and a third RLC entity 525. In the depicted embodiment, the first RLC entity 515 and second RLC entity 520 belong to the same radio bearer as the first PDCP entity 505. Note that the third RLC entity 525 is associated with the second PDCP entity 510 belonging to a second radio bearer. The RLC entities 515-525 are located in a RLC layer of the protocol stack 500 and perform RLC functions, including (but not limited to) segmentation and reassembly packets in to adapt them to the size suitable for radio interface. The protocol stack 600 includes a first logical channel 610 associated with the first RLC entity 515, a second logical channel 615 associated with the second RLC entity 520, and a third logical channel 620 associated with the third RLC entity 525.

In the depicted embodiment, the UE 205 is configured for carrier aggregation, thus having a single MAC entity 605 associated with the logical channels 610-615. The MAC entity 605 is located in a MAC layer of the protocol stack 600 and performs MAC functions.

In various embodiments, PDCP duplication is used in a CA-based architecture, such as that supported by the protocol stack 600. A NE, e.g., a gNB, configures the UE 205 with a first PDCP entity 505 which is mapped to two RLC entities 515-520. Here, the PDCP PDUs may be mapped to two different logical channels (e.g., the logical channels 610-615). In one embodiment, the two logical channels are mapped to different logical channel groups for the purpose of buffer status reporting, e.g., a separate buffer status being reported for the two logical channels 610-615. The MAC entity 605 ensures that duplicated PDCP PDUs are mapped to different carriers or optionally to different Transport Blocks (TB)s during LCP procedure.

The NE, e.g. gNB, signals to the UE 205 the PDCP duplication configuration, e.g., activation/deactivation of packet duplication. In certain embodiments, this signaling may be PDCP control signaling or MAC control signaling. Alternatively, the signaling may be RRC signaling. According to one embodiment the NE configures the UE 205 with one RLC entity, which UE 205 uses for PDCP data transmission when packet duplication is deactivated. In certain embodiments, this configuration may be done by RRC signaling.

In one embodiment, when duplication is activated the UE 205 reports the same PDCP buffer occupancy within the buffer status report (BSR) for both logical channels 610-615 associated with the first PDCP entity 505. Routing of PDCP PDUs to both RLC entities is based on received UL grants, i.e. when the UE 205 receives an UL grant and the MAC entity 605 indicates (as a result of LCP procedure) to one of the two RLC entities/logical channel the amount of data for transmission, the corresponding PDCP PDUs are generated, duplicated and may be forwarded to the indicated RLC entity and may be also to the other RLC entity/logical channel.

According to some embodiments, the NE signals to the UE a configuration directing the UE 205 to use either only one RLC entity/logical channel or both RLC entities/logical channels, e.g., deactivating/activating duplication. As noted above, this configuration may be signalled by PDCP control signalling, MAC control signalling, or RRC signalling. In certain embodiments, the default state for duplication is deactivated when PDCP entity is configured with two logical channels/RLC entities. Thus, the NE may need to explicitly activate PDCP duplication.

In certain embodiments, in response to receiving an indication from NE directing the UE 205 to deactivate duplication, the UE 205 flushes the RLC transmission buffer of the deactivated RLC entity (e.g., the RLC entity/logical channel which is not used for data transmission as indicated by configuration). In certain embodiments, the data available for transmission in PDCP for the "deactivated" logical channel/RLC entity is set to zero. Alternatively, the MAC entity 605 may not report buffer status information for the deactivated RLC entity/logical channel. According to another embodiment, the UE 205 may re-establish the RLC entity which is not used for data transmission.

In certain embodiments, the UE 205 suspends the logical channel/RLC entity which is not used for data transmission when NE directs the UE 205 to deactivate duplication. Here, the MAC entity 605 does not report buffer status information for the suspended logical channel. Alternatively, the UE 205 may re-establish the RLC entity of the suspended logical channel or flush the RLC buffer, as discussed above.

In some embodiment, the logical channels 610-620 may be associated with token buckets, used to control transmissions. Here, the MAC entity 605 may maintain a variable Bj for each logical channel j, Bj representing the status of the token bucket for that logical channel. In various embodiments, the token bucket status Bj is initialized to zero when the related logical channel is established, and incremented by the product PBR×TTI duration for each TTI, where PBR is Prioritized Bit Rate of logical channel j. In certain embodiments, the UE 205 initializes Bj for a previously "inactive" (or suspended) logical channel j to zero when duplication is activated (e.g., sets the number of tokens in the bucket of logical channel j to zero). In certain embodiments, the value of Bj may be initialized to zero for an inactive/suspended logical channel when duplication is deactivated. In various embodiments, the UE 205 does not maintain the token bucket status of a "inactive" logical channel j when duplication is deactivated, e.g., the UE 205 stops incrementing the token bucket status Bj.

In certain embodiments, the UE 205 cancels, if any, triggered Scheduling Requests and/or buffer status reports caused by data arrival of the inactivated/suspended logical channel when duplication is deactivated. Note that the Scheduling Request(s) and/or buffer status report(s) are triggered by data arrival for the now "inactivated" logical channel.

In some embodiments, the MAC entity 605 discards packets which are received for a RLC entity which is suspended or "inactive" when duplication is deactivated. Note that RLC PDUs of an "inactive" RLC entity/logical channel might be still subject to HARQ retransmission and therefore arrive after having disabled duplication.

Figure 7:
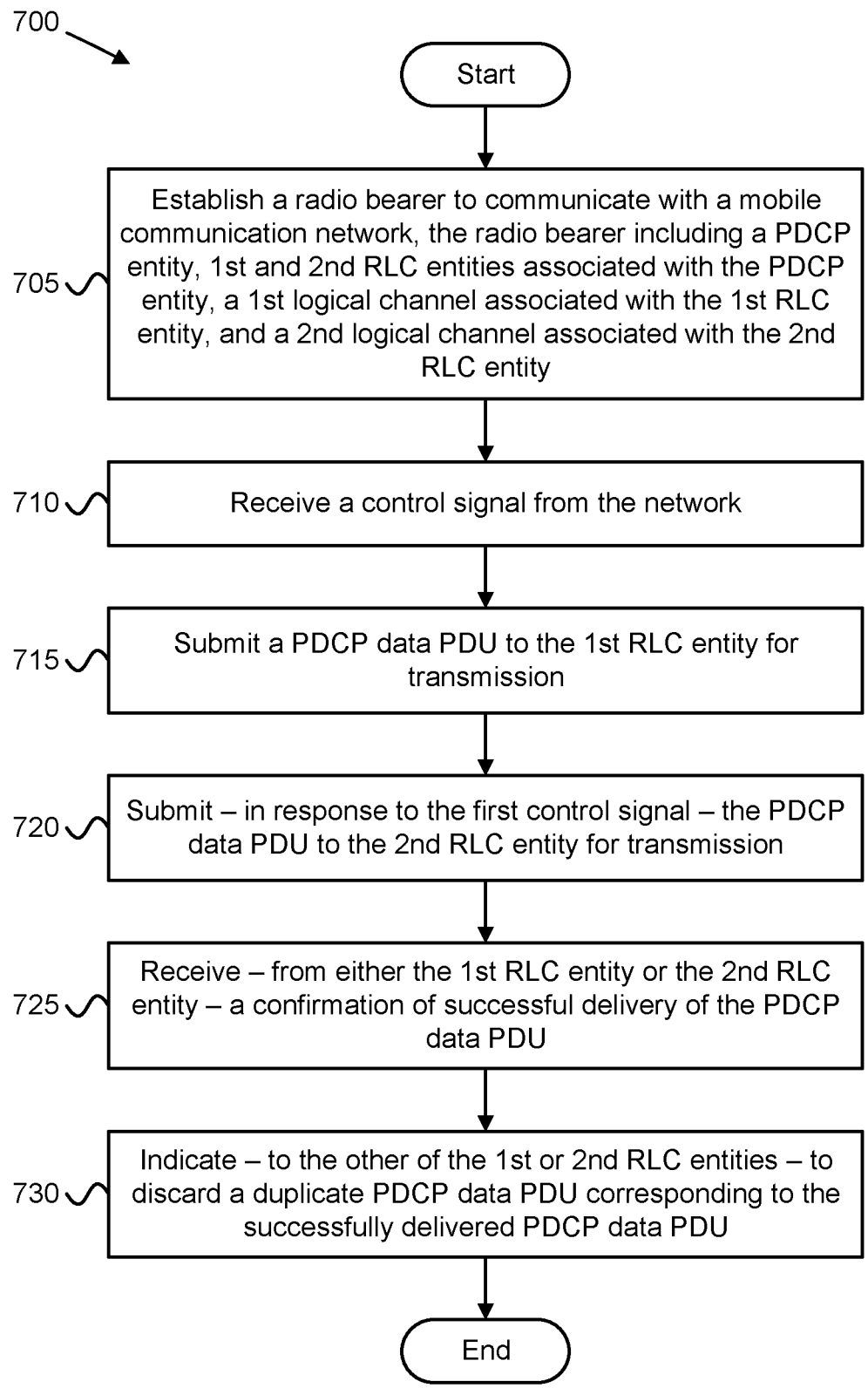
FIG. 7 is a flowchart diagram illustrating one embodiment of a method for duplicating PDCP PDUs for a radio bearer.

FIG. 7 depicts a method 700 for duplicating PDCP PDUs for a radio bearer, according to embodiments of the disclosure. In some embodiments, the method 700 is performed by a remote unit, such as the remote unit 105, the UE 205, and/or the user equipment apparatus 300, described above. In some embodiments, the method 700 is performed by a processor executing program code, for example, a microcontroller, a microprocessor, a CPU, a GPU, an auxiliary processing unit, a FPGA, or the like.

The method 700 begins and establishes 705 a radio bearer to communicate with a mobile communication network. Here, the radio bearer includes a PDCP entity, first and second RLC entities associated with said PDCP entity, a first logical channel associated with the first RLC entity, and a second logical channel associated with the second RLC entity. The method 700 includes receiving 710, at the remote unit, a first control signal from the mobile communication network.

The method 700 includes submitting 715, from the PDCP entity, a PDCP data protocol data unit ("PDU") to the first RLC entity for transmission. The method 700 includes submitting 720, from the PDCP entity and in response to the first control signal, the PDCP data PDU to the second RLC entity for transmission.

The method 700 includes receiving 725, at the PDCP entity and from either the first RLC entity or the second RLC entity, a confirmation of successful delivery of the PDCP a data PDU. The method 700 includes indicating 730 to the other one of the first RLC entity or the second RLC entity to discard a duplicate PDCP data PDU corresponding to the successfully delivered PDCP data PDU. The method 700 ends.

Disclosed herein is a first apparatus for duplicating PDCP PDUs for a radio N bearer. The first apparatus includes a processor and a transceiver that communicates with a mobile communication network. The processor establishes a radio bearer to communicate with a mobile communication network, the radio bearer comprising a PDCP protocol entity, a first RLC protocol entity and a second RLC protocol entity being associated with said PDCP protocol entity, a first logical channel being associated with said first RLC protocol entity, and a second logical channel being associated with said second RLC protocol entity. The processor receives a first control signal from the mobile communication network, duplicates PDCP data protocol data units ("PDUs") in the PDCP protocol entity, and submits the duplicated PDCP data PDUs to the first RLC protocol entity and the second RLC protocol entity for transmission, in response to the first control signal. Additionally, the processor indicates to one of the first RLC protocol entity and the second RLC protocol entity to discard one or more duplicated PDCP data PDUs in response to receiving a confirmation of successful delivery of a corresponding one or more PDCP data PDUs by the other RLC protocol entity.

In certain embodiments of the first apparatus, the other RLC protocol entity indicates the successful delivery of the corresponding one or more PDCP data PDUs to the PDCP protocol entity based on a RLC status report received from the mobile communication network and the PDCP protocol entity sends a discard indication, in response to receiving said indication of successful delivery, to the one of the first RLC protocol entity and the second RLC protocol entity to discard the one or more duplicated PDCP data PDUs. In such embodiments, the processor may further discard one or more PDCP data PDUs in the one of the first RLC protocol entity and the second RLC protocol entity in response to receiving the discard indication from the PDCP protocol entity. In other embodiments of the first apparatus, the processor discards the one or more PDCP data PDUs in the one of the first RLC protocol entity and the second RLC protocol entity based on a PDCP status report received from the mobile communication network.

In certain embodiments of the first apparatus, the processor further indicates an amount of PDCP data PDUs in the PDCP protocol entity to a MAC entity associated with the first RLC protocol entity and to a MAC entity associated with the second RLC protocol entity for reporting the buffer status of the logical channels associated with the first RLC protocol entity and second RLC protocol entity, in response to the first control signal.

In some such embodiments, each of the RLC protocol entities belongs to a different cell group in the mobile communication network, wherein the MAC entity associated with the first RLC protocol entity is a first MAC entity and the MAC entity associated with the second RLC protocol entity is a second MAC entity different than the first, wherein the processor indicates a same amount of PDCP data PDUs in the PDCP protocol entity to the first MAC entity and to the second MAC entity for reporting the buffer status of the first logical channel and the second logical channel. Here, a split bearer may be established in the apparatus and wherein the first control signal comprises an indication to duplicate PDCP data PDUs over the split bearer. Additionally, the processor may set an uplink data split threshold to zero in response to receiving the first control signal, the first control signal activating packet duplication, and sets the uplink data split threshold to infinity in response to receiving a second control signal, the second control signal deactivating packet duplication.

In other such embodiments, the first RLC protocol entity and the second RLC protocol entity belong to a same Cell group, wherein the MAC entity associated with the first RLC protocol entity and the MAC entity associated with the second RLC protocol entity is the same MAC entity, wherein the processor indicates a same amount of PDCP data PDUs in the PDCP protocol entity to the same MAC entity for reporting the buffer status of the first logical channel and the second logical channel. Here, processor may receive a second control signal and deactivates packet duplication, wherein the processor indicates an amount of PDCP data PDUs available for transmission in the PDCP protocol entity to the MAC entity associated with the second RLC protocol entity for reporting buffer status of the second logical channel to zero, in response to the second control signal. Additionally, processor may receive a third control signal prior to the second control signal, the third control signal indicating to use the first RLC protocol entity for transmission of PDCP data PDUs upon deactivating packet duplication.

In certain embodiments of the first apparatus, the first control signal instructs the apparatus to begin duplicating PDCP data PDUs. Here, the processor may receive a second control signal that instructs the apparatus to stop duplicating PDCP data PDUs. In some such embodiments, the processor cancels a scheduling request associated with the second logical channel in response to the second control signal, the scheduling request being triggered by data arrival for the second logical channel. In other embodiments, the processor may cancel a buffer status report associated with the second logical channel in response to the second control signal, the buffer status report being triggered by data arrival for the second logical channel.

In certain embodiments of the first apparatus, the first control signal initializes a token bucket status for a previously inactive logical channel, an amount of tokens in the token N bucket being periodically incremented, wherein the previously inactive logical channel is one of the first logical channel and the second logical channel. In such embodiments, the processor further receives a second control signal, the second control signal deactivating packet duplication, wherein the processor does not maintain a token bucket associated with the second logical channel in response to the second control signal.

In certain embodiments of the first apparatus, the first control signal is one of: a PDCP control signal, a MAC control signal, and an RRC signal.

Disclosed herein is a first method for duplicating PDCP PDUs for a radio bearer. The first method includes establishing, at a remote unit, a radio bearer to communicate with a mobile communication network, the radio bearer comprising a PDCP protocol entity, a first RLC protocol entity and a second RLC protocol entity being associated with said PDCP protocol entity, a first logical channel being associated with said first RLC protocol entity, and a second logical channel being associated with said second RLC protocol entity. The first method includes receiving, at the remote unit, a first control signal from the mobile communication network, duplicating, at the remote unit, PDCP data PDUs in the PDCP protocol entity, and submitting the duplicated PDCP PDUs to the first RLC protocol entity and the second RLC protocol entity for transmission, in response to the first control signal. The first method also includes indicating to one of the first RLC protocol entity and the second RLC protocol entity to discard one or more duplicated PDCP data PDUs in response to receiving confirmation of successful transmission of a corresponding one or more PDCP data PDUs by the other RLC protocol entity.

In certain embodiments of the first method, the other RLC protocol entity indicates the successful delivery of the corresponding one or more PDCP data PDUs to the PDCP protocol entity based on a RLC status report received from the mobile communication network. Here, the PDCP protocol entity indicates to the one of the first RLC protocol entity and the second RLC protocol entity to discard the one or more duplicated PDCP data PDUs, in response to receiving said indication of successful delivery. In such embodiments, the first method includes discarding one or more PDCP data PDUs in the one of the first RLC protocol entity and the second RLC protocol entity in response to receiving the discard indication from the PDCP protocol entity. In other embodiments, the first method includes discarding the one or more PDCP data PDUs in the one of the first RLC protocol entity and the second RLC protocol entity based on a PDCP status report received from the mobile communication network.

In certain embodiments, the first method includes indicating an amount of PDCP data PDUs in the PDCP protocol entity to a MAC entity associated with the first RLC protocol entity and to a MAC entity associated with the second RLC protocol entity for reporting the buffer status of the logical channels associated with the first RLC protocol entity and second RLC protocol entity, in response to the first control signal.

In certain embodiments of the first method, each of the RLC protocol entities belongs to a different cell group in the mobile communication network, wherein the MAC entity associated with the first RLC protocol entity is a first MAC entity and the MAC entity associated with the second RLC protocol entity is a second MAC entity different than the first, wherein the remote unit indicates a same amount of PDCP data PDUs in the PDCP protocol entity to the first MAC entity and to the second MAC entity for reporting the buffer status of the first logical channel and the second logical channel. In such embodiments, a split bearer is established in the remote unit, wherein the first control signal comprises an indication to duplicate PDCP data PDUs over the split bearer. In some embodiments, the first method includes setting an uplink data split threshold to zero in response to receiving the first control signal and setting the uplink data split threshold to infinity in response to receiving a second control signal, where the first control signal activates packet duplication and the second control signal deactivates packet duplication.

In certain embodiments of the first method, the first RLC protocol entity and the second RLC protocol entity belong to a same cell group, wherein the MAC entity associated with the first RLC protocol entity and the MAC entity associated with the second RLC protocol entity is the same MAC entity. In such embodiments, the first method includes indicating a same amount of PDCP data PDUs in the PDCP protocol entity to the same MAC entity for reporting the buffer status of the first logical channel and the second logical channel. In some embodiments, the first method includes receiving a second control signal and deactivates packet duplication, wherein the remote unit indicates an amount of PDCP data PDUs available for transmission in the PDCP protocol entity to the MAC entity associated with the second RLC protocol entity for reporting buffer status of the second logical channel to zero, in response to the second control signal. In some embodiments, the first method includes receiving a third control signal prior to the second control signal, the third control signal indicating to use the first RLC protocol entity for transmission of PDCP data PDUs upon deactivating packet duplication.

In certain embodiments of the first method, the first control signal instructs the remote unit to begin duplicating PDCP data PDUs, the first method further including receiving a second control signal that instructs the remote unit to stop duplicating PDCP data PDUs. In some embodiments, the first method includes cancelling a scheduling request associated with the second logical channel in response to the second control signal, the scheduling request being triggered by data arrival for the second logical channel. In some embodiments, the first method includes cancelling a buffer status report associated with the second logical channel in response to the second control signal, the buffer status report being triggered by data arrival for the second logical channel.

In certain embodiments, the first method includes initializing a token bucket status for a previously inactive logical channel, an amount of tokens in the token bucket being periodically incremented, wherein the previously inactive logical channel is one of the first logical channel and the second logical channel. In such embodiments, the first method may include receiving a second control signal, the second control signal deactivating packet duplication, wherein the remote unit does not maintain a token bucket associated with the second logical channel in response to the second control signal. In various embodiments of the first method, the first control signal is one of: a PDCP control signal, a MAC control signal, and an RRC signal.

Disclosed herein is a second apparatus for duplicating PDCP PDUs for a radio bearer. The second apparatus includes a processor and a transceiver that communicates with a mobile communication network. The processor establishes a radio bearer to communicate with a mobile communication network, the radio bearer comprising a PDCP protocol entity, a first RLC protocol entity and a second RLC protocol entity being associated with said PDCP protocol entity, a first logical channel being associated with said first RLC protocol entity, and a second logical channel being associated with said second RLC protocol entity. Via the transceiver, the processor receives a first control signal from the mobile communication network. The processor submits a PDCP data PDU in the PDCP entity to the first RLC entity for transmission. In response to the first control signal, the processor submits the PDCP data PDU to the second RLC entity for transmission. The PDCP entity receives, from one of the first RLC entity and the second RLC entity, a confirmation of successful delivery of the PDCP data PDU and indicates to the other one of the first RLC entity and the second RLC entity to discard a duplicate PDCP data PDU corresponding to the successfully delivered PDCP data PDU.

In some embodiments, the one of the first RLC entity and the second RLC entity indicates the successful delivery of the PDCP data PDU to the PDCP entity based on a RLC status report received from the mobile communication network. In one embodiment, the RLC status report confirms successful delivery of the PDCP data PDU. Moreover, the processor discards the duplicate PDCP data PDU in the other one of the first RLC entity and the second RLC entity in response to receiving the discard indication from the PDCP entity.

In some embodiments, the processor discards the duplicate PDCP data PDU in the other one of the first RLC entity and the second RLC entity based on a PDCP status report received from the mobile communication network. In one embodiment, the PDCP status report confirms successful delivery of the PDCP data PDU.

In some embodiments, the processor further indicates an amount of PDCP data PDUs in the PDCP entity to a MAC entity associated with the first RLC entity and to a MAC entity associated with the second RLC entity for reporting a buffer status of the logical channels associated with the first RLC entity and second RLC entity, in response to the first control signal.

In certain embodiments, each of the RLC entities belongs to a different cell group in the mobile communication network, wherein the MAC entity associated with the first RLC entity is a first MAC entity and the MAC entity associated with the second RLC entity is a second MAC entity different than the first MAC entity, wherein the processor indicates a same amount of PDCP data PDUs in the PDCP entity to the first MAC entity and to the second MAC entity for reporting the buffer status of the first logical channel and the second logical channel. In such embodiments, establishing the radio bearer comprises establishing a split bearer in the apparatus and wherein the first control signal comprises an indication to activate PDCP duplication over the split bearer.

In certain embodiments, the first RLC entity and the second RLC entity belong to a same Cell group, wherein the MAC entity associated with the first RLC entity and the MAC entity associated with the second RLC entity is the same MAC entity, wherein the processor indicates a same amount of PDCP data PDUs in the PDCP entity to the same MAC entity for reporting the buffer status of the first logical channel and the second logical channel.

In certain embodiments, the processor receives a second control signal and deactivates packet duplication, wherein the processor indicates to a MAC entity associated with the second RLC entity that the amount of PDCP data PDUs available for transmission in the PDCP entity for reporting buffer status of the second logical channel is zero, in response to the second control signal. In such embodiments, processor receives a third control signal prior to the second control signal, the third control signal indicating to use the first RLC entity for transmission of PDCP data PDUs upon deactivating packet duplication.

In some embodiments, the first control signal instructs the apparatus to activate PDCP duplication, the processor further receiving a second control signal that instructs the apparatus to deactivate PDCP duplication. In certain embodiments, the processor sets an uplink data split threshold of the radio bearer to zero in response to receiving the first control signal, and wherein the processor sets the uplink data split threshold of the radio bearer to infinity in response to receiving the second control signal.

In certain embodiments, the processor cancels a scheduling request associated with the second logical channel in response to the second control signal, the scheduling request being triggered by data arrival for the second logical channel. In certain embodiments, the processor cancels a buffer status report associated with the second logical channel in response to the second control signal, the buffer status report being triggered by data arrival for the second logical channel.

In various embodiments, the first control signal is one of: a PDCP control signal, a MAC control signal, and an RRC signal.

Disclosed herein is a second method for duplicating PDCP PDUs for a radio bearer. The second method includes establishing, at a remote unit, a radio bearer to communicate with a mobile communication network, the radio bearer comprising a PDCP protocol entity, a first RLC protocol entity and a second RLC protocol entity being associated with said PDCP protocol entity, a first logical channel being associated with said first RLC protocol entity, and a second logical channel being associated with said second RLC protocol entity. The second method includes receiving, at the remote unit, a first control signal from the mobile communication network. The second method includes submitting, from the PDCP entity, a PDCP data PDU to the first RLC entity for transmission and, in response to the first control signal, submitting, from the PDCP entity, the PDCP data PDU to the second RLC entity for transmission. The second method includes receiving, at the PDCP entity and from one of the first RLC entity and the second RLC entity, a confirmation of successful delivery of the PDCP data PDU and indicating to the other one of the first RLC entity and the second RLC entity to discard a duplicate PDCP data PDU corresponding to the successfully delivered PDCP data PDU.

In some embodiments, the one of the first RLC entity and the second RLC entity indicates the successful delivery of the PDCP data PDU to the PDCP entity based on a RLC status report received from the mobile communication network. In one embodiment, the RLC status report confirms successful delivery of the PDCP data PDU. In certain embodiments, the second method includes discarding the duplicate PDCP data PDU in the other one of the first RLC entity and the second RLC entity in response to receiving the discard indication from the PDCP entity.

In certain embodiments, the second method includes discarding the duplicate PDCP data PDU in the other one of the first RLC entity and the second RLC entity based on a PDCP status report received from the mobile communication network. In one embodiment, the PDCP status report confirms successful delivery of the PDCP data PDU.

In certain embodiments, the second method includes indicating an amount of PDCP data PDUs in the PDCP entity to a MAC entity associated with the first RLC entity for reporting a buffer status of the first logical channel, and indicating an amount of PDCP data PDUs in the PDCP entity to a MAC entity associated with the second RLC entity for reporting a buffer status of the second logical channel, in response to the first control signal.

In some embodiments, each of the RLC entities belongs to a different cell group in the mobile communication network. In such embodiments, the MAC entity associated with the first RLC entity is a first MAC entity and the MAC entity associated with the second RLC entity is a second MAC entity different than the first MAC entity, and indicating an amount of PDCP data PDUs in the PDCP entity comprises indicating a same amount of PDCP data PDUs to the first MAC entity and to the second MAC entity. In certain embodiments, establishing the radio bearer comprises establishing a split bearer in the apparatus and wherein the first control signal comprises an indication to activate PDCP duplication over the split bearer.

In some embodiments, the first RLC entity and the second RLC entity belong to a same Cell group. In such embodiments, the MAC entity associated with the first RLC entity and the MAC entity associated with the second RLC entity is a common MAC entity, and indicating an amount of PDCP data PDUs in the PDCP entity comprises indicating a same amount of PDCP data PDUs to the common MAC entity.

In certain embodiments, the second method includes receiving a second control signal and deactivates packet duplication, and indicating to a MAC entity associated with the second RLC entity that the amount of PDCP data PDUs available for transmission in the PDCP entity for reporting buffer status of the second logical channel is zero, in response to the second control signal. In certain embodiments, the second method includes receiving a third control signal prior to the second control signal, the third control signal indicating to use the first RLC entity for transmission of PDCP data PDUs upon deactivating packet duplication.

In some embodiments, the first control signal instructs the UE to activate PDCP duplication, the method further comprising receiving a second control signal that instructs the apparatus to deactivate PDCP duplication. In certain embodiments, the second method includes setting an uplink data split threshold of the radio bearer to zero in response to receiving the first control signal, and setting the uplink data split threshold of the radio bearer to infinity in response to receiving the second control signal.

In certain embodiments, the second method includes cancelling a scheduling request associated with the second logical channel in response to the second control signal, the scheduling request being triggered by data arrival for the second logical channel. In certain embodiments, the second method includes cancelling a buffer status report associated with the second logical channel in response to the second control signal, the buffer status report being triggered by data arrival for the second logical channel.

In various embodiments, the first control signal is one of: a PDCP control signal, a MAC control signal, and an RRC signal.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    establishing, at a user equipment ("UE"), a radio bearer to communicate with a mobile communication network, the radio bearer comprising a Packet Data Convergence Protocol ("PDCP") entity, a first Radio Link Control ("RLC") entity and a second RLC entity being associated with the PDCP entity, a first logical channel being associated with the first RLC entity, and a second logical channel being associated with the second RLC entity;
    receiving a first control signal;
    submitting, from the PDCP entity, a PDCP data protocol data unit ("PDU") to the first RLC entity;
    submitting, from the PDCP entity and in response to the first control signal, the PDCP data PDU to the second RLC entity;
    receiving, at the PDCP entity from the first RLC entity or the second RLC entity, a confirmation of successful delivery of the PDCP data PDU; and
    indicating to the first RLC entity or the second RLC entity to discard a duplicate PDCP data PDU based on the successful delivery of the PDCP data PDU.

2. The method of claim 1, wherein the first RLC entity or the second RLC entity indicates the successful delivery of the PDCP data PDU to the PDCP entity based on a RLC status report.

3. The method of claim 1, further comprising discarding the duplicate PDCP data PDU in response to the indication.

4. The method of claim 1, further comprising:
indicating a first amount of PDCP data PDUs to a first medium access control ("MAC") entity associated with the first RLC entity for reporting a buffer status of the first logical channel, in response to the first control signal; and
indicating a second amount of PDCP data PDUs to a second MAC entity associated with the second RLC entity for reporting a buffer status of the second logical channel, in response to the first control signal.

5. The method of claim 4,
wherein each of the RLC entities belongs to a different cell group,
wherein the second MAC entity is different than the first MAC entity, and
wherein indicating the first amount of PDCP data PDUs and the second amount of PDCP data PDUs comprises indicating a same amount of PDCP data PDUs to the first MAC entity and to the second MAC entity.

6. The method of claim 1, wherein establishing the radio bearer comprises establishing a split bearer configured for PDCP duplication in the UE and wherein the first control signal comprises an indication to activate PDCP duplication over the split bearer.

7. The method of claim 4,
wherein the first RLC entity or the second RLC entity belong to a same Cell group,
wherein the first MAC entity or the second MAC entity is a common MAC entity, and
wherein indicating the first amount of PDCP data PDUs and the second amount of PDCP data PDUs comprises indicating a same amount of PDCP data PDUs to the common MAC entity.

8. The method of claim 4, further comprising:
receiving a second control signal and deactivating packet duplication, and
indicating to the second MAC entity that the second amount of PDCP data PDUs is zero, in response to the second control signal.

9. The method of claim 8, further comprising receiving a third control signal prior to the second control signal, the third control signal indicating to use the first RLC entity to transmit one or more PDCP data PDUs upon deactivating the packet duplication.

10. The method of claim 1, wherein the first control signal instructs the UE to activate PDCP duplication, the method further comprising receiving a second control signal that instructs the UE to deactivate the PDCP duplication.

11. The method of claim 10, further comprising:
setting an uplink data split threshold of the radio bearer to zero in response to receiving the first control signal, and
setting the uplink data split threshold of the radio bearer to infinity in response to receiving the second control signal.

12. The method of claim 10, further comprising:
triggering a scheduling request associated with the second logical channel based on an arrival of data for the second logical channel; and
cancelling the scheduling request in response to the second control signal.

13. The method of claim 10, further comprising:
triggering a buffer status report associated with the second logical channel based on an arrival of data for the second logical channel; and
cancelling the buffer status report in response to the second control signal.

14. The method of claim 1, wherein the first control signal is one of: a PDCP control signal, a MAC control signal, or an RRC signal.

15. A user equipment (UE), comprising:
at least one memory; and
at least one processor coupled with the at least one memory and configured to cause the UE to;
establish a radio bearer to communicate with a mobile communication network, the radio bearer comprising a Packet Data Convergence Protocol ("PDCP") entity, a first Radio Link Control ("RLC") entity and a second RLC entity being associated with the PDCP entity, a first logical channel being associated with the first RLC entity, and a second logical channel being associated with the second RLC entity;
receive a first control signal;
submit, from the PDCP entity, a PDCP data protocol data unit ("PDU") to the first RLC entity;
submit, from the PDCP entity and in response to the first control signal, the PDCP data PDU to the second RLC entity;
receive, from the first RLC entity or the second RLC entity, a confirmation of successful delivery of the PDCP data PDU; and
indicate to the first RLC entity or the second RLC entity to discard a duplicate PDCP data PDU based on the successful delivery of the PDCP data PDU.

16. The UE of claim 15, wherein the first RLC entity or the second RLC entity indicates the successful delivery of the PDCP data PDU to the PDCP entity based on a RLC status report.

17. The UE of claim 15, wherein the at least one processor is configured to cause the UE to discard discards the duplicate PDCP data PDU in response to the indication.

18. The UE of claim 15, wherein the at least one processor is configured to cause the UE to:
indicate a first amount of PDCP data PDUs in the PDCP entity to a first medium access control ("MAC") entity associated with the first RLC entity for reporting a buffer status of the logical channels associated with the first RLC entity, in response to the first control signal; and
indicate a second amount of PDCP data PUDs to a second MAC entity associated with the second RLC entity for reporting a buffer status of the logical channels associated with the second RLC entity, in response to the first control signal.

19. The UE of claim 18,
wherein the first RLC entity or the second RLC entity belong to a different cell group,
wherein the second MAC entity is different than the first MAC entity, and
wherein the at least one processor is configured to cause the UE to indicate a same amount of PDCP data PDUs in the PDCP entity to the first MAC entity and to the second MAC entity.

20. The UE of claim 18,
wherein the first RLC entity or the second RLC entity belong to a same Cell group,
wherein the first MAC entity or the second MAC entity is a same MAC entity,
wherein the at least one processor is configured to cause the UE to indicate a same amount of PDCP data PDUs in the PDCP entity to the same MAC entity.

* * * * *